United States Patent [19]

Sparks et al.

[11] Patent Number: 5,749,985
[45] Date of Patent: May 12, 1998

[54] PROCESS FOR OPTIMIZING MULTILAYERED TUBES MADE OF COMPOSITE MATERIALS AND TUBES OBTAINED THROUGH THE PROCESS

[75] Inventors: Charles Sparks, Le Vesinet; Jacques Schmitt, Bois Colombe; Guy Metivaud, Talence; Marcel Auberon, Le Haillan, all of France

[73] Assignees: Institut Francais du Petrole, Rueil Malmaison; Societe Aerospatiale, Paris, both of France

[21] Appl. No.: 18,522

[22] Filed: Feb. 17, 1993

Related U.S. Application Data

[63] Continuation of Ser. No. 540,749, Jun. 20, 1990, abandoned.

[30] Foreign Application Priority Data

Jun. 20, 1989 [FR] France .................................. 89/08308

[51] Int. Cl.$^6$ .................................................. B32B 31/00
[52] U.S. Cl. .............................. 156/64; 156/184; 156/187; 156/192; 156/195
[58] Field of Search ...................................... 156/184, 187, 156/189, 191, 192, 195, 64

[56] References Cited

U.S. PATENT DOCUMENTS

| | | | |
|---|---|---|---|
| 4,404,053 | 9/1983 | Saffire | 156/189 X |
| 4,755,406 | 7/1988 | Fuchs | 156/188 X |
| 4,909,880 | 3/1990 | Kittelson et al. | 156/189 |
| 4,921,557 | 5/1990 | Nakamura | 156/189 X |
| 4,946,528 | 8/1990 | Takahashi et al. | 156/187 |
| 5,066,350 | 11/1991 | Sullins | 156/187 |
| 5,223,067 | 6/1993 | Hamamoto et al. | 156/189 X |

*Primary Examiner*—David A. Simmons
*Assistant Examiner*—Paul M. Rivard
*Attorney, Agent, or Firm*—Antonelli, Terry, Stout, & Kraus, LLP

[57] ABSTRACT

Process for optimizing the features of multilayered tubes made of fibrous composite materials, allowing to maintain within the specified limits the limit elongations and stresses which they withstand in response to the applied strains. The process comprises selecting at least two optimized features characteristic of each layer (its thickness and the winding angle of the fibers for example) by starting from an initial tube selected a priori. Through small deviations applied to the parameters, the relations between small deviations applied to the parameters and the variations of the resulting limit elongations and stresses are determined, as well as the inverse relations relating the variations of the limit elongations and stresses to the parameter deviations. Knowing these inverse relations allows, in one or several stages, to find out the deviations to be applied in order to make up the measurable differences between the limit elongations and stresses of the optimized tube and the tube selected a priori. Application to the achievement of tubular pipes for the oil industry for example.

7 Claims, 1 Drawing Sheet

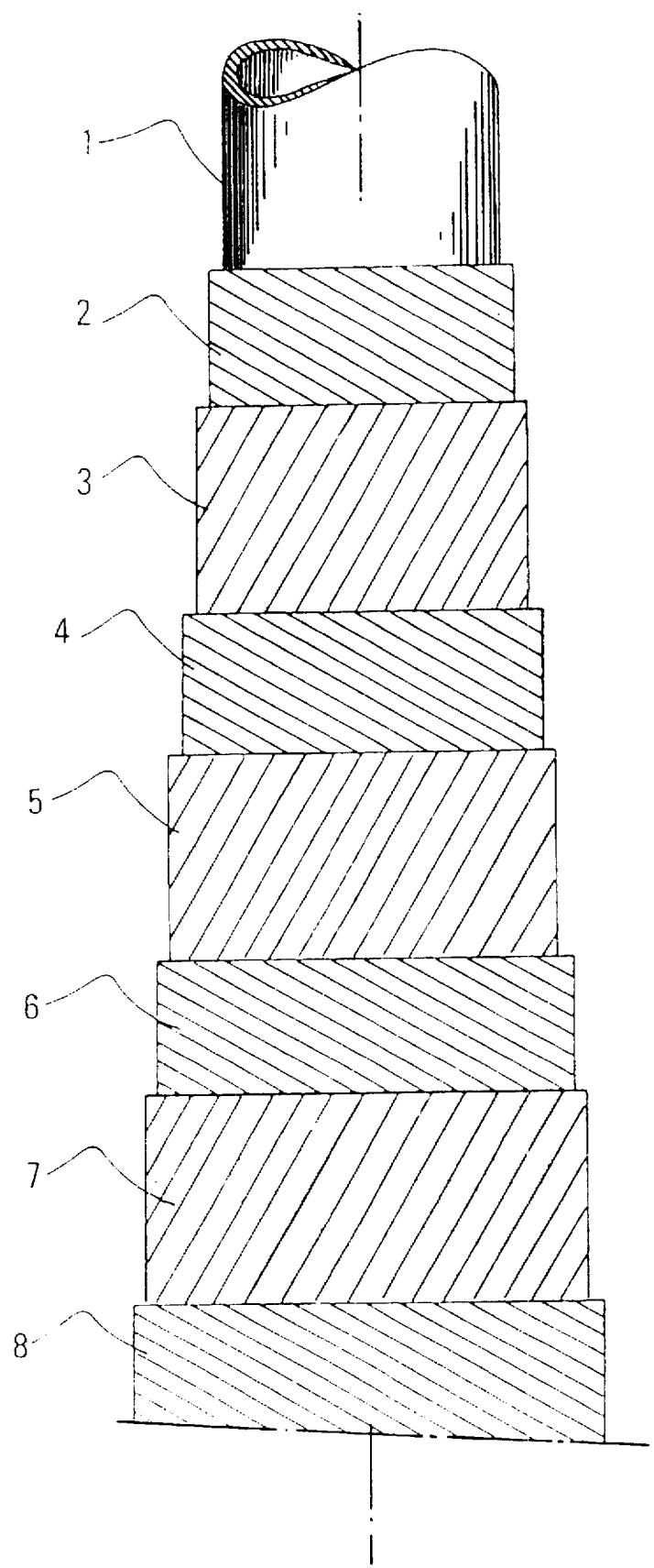

PROCESS FOR OPTIMIZING MULTILAYERED TUBES MADE OF COMPOSITE MATERIALS AND TUBES OBTAINED THROUGH THE PROCESS

This is a continuation of application Ser. No. 540,749 filed Jun. 20, 1990, now abandoned.

BACKGROUND OF THE INVENTION

The present invention relates to a process for optimizing the features of multilayered tubes made of composite materials, allowing the tube to be maintained within specified limits the stresses which they have to withstand in response to the strains which may be applied to them. and The composite materials are fashioned by coating glass fibers, carbon fibers or fibers of other products such as aramids in a thermoplastic or duroplastic substance such as, for example an epoxy resin, which is generally called a matrix.

The process according to the invention finds its applications in many fields and, particularly, for the manufacturing of the tubes used in the oil industry.

It is well-known that offshore hydrocarbon exploration and development operations require the use of tubular strings connecting the sea bed to a surface support such as a drilling or a development platform or a subsurface buoy. These strings, which are commonly called risers, can serve, for example, for protecting the tubings. Although they are not subjected to the pressure of the fluid rising from the deposit under normal working conditions, the strings must be able to withstand it in case of a leakage or of a fracture of the tubings. In conditions where they are used, the tubular strings may undergo substantial length variations because of their weight, of the temperature changes or of the bottom effects which occur when a pressure increase causes longitudinal stresses at their head. The rise in pressure or in temperature generally goes together with a buckling tendency, which requires the use of special guides and creates considerable bending and compressive stresses at their base.

Strings of this type are also utilized around offshore drilling strings, notably for mud grouting. Here again, the internal pressure increase causes effects similar to buckling and requires the use of a complex guiding system.

The effects cited above make it difficult to bury the subsea flowlines which, while bending out of shape, tend to leave the trench in which they have been buried. In order to avoid the difficulties linked to the elongation of the strings, a process consists, when this is possible, in subjecting them to considerable tension prestresses or in maintaining them stretched by generally very complex tensioning systems which provide a minimum tensile stress depending on the imposed operating conditions.

Another process consists in manufacturing tubes the elongation of which is practically insensible to the variations of the operating conditions, in order to considerably simplify their implementing.

French Patent 2,557,254 or U.S. Pat. No. 4,867,205 describe a process for allowing flexible pipes to achieve the elongation of which is practically insensitive to the effect of the internal pressure, by superposing several yarn or cable layers that are wound up helically and by selecting their respective stiffness and winding angles within a determined range of values.

In French Patent Specification 2,627,840 a process is proposed for tubes of composite materials wherein the length of of the tubes practically never changes under the effect of the internal pressure variations. The tubes manufactured thereby comprise several layers of composite materials, with each of the layers include several strips of helically wound coated fibers following the same pitch but with opposite directions of winding, and with the layer volumes, the moduli of elasticity and respectively respective winding angles being selected for the values of a determined function depending on these three parameters to range between two well-defined limits. In practice, it is necessary to determine whether the selection for the parameters of values compatible with a value allowed for the combination function actually leads to the planned result.

Still the previous processes do generally not allow a determination of the best possible values for the different parameters. This possible latitude of the parameters definitely has an effect upon the weight and the cost of the manufactured tubes. It is therefore advisable, for the same performances, to optimize the values of the various parameters in order to decrease their cost.

SUMMARY OF THE INVENTION

The process according to the invention remedies the inaccuracies of the previous processes by allowing an optimization of the features of tubes made of composite materials consisting of a given number of composite material layers of determined thicknesses with each of the layers comprising several strips of helically wound fibers, with the different layers being defined by at least two characteristic parameters, so that an elongation of the layers under the effect of the temperature and the pressure, as well as the limit stresses undergone by the various layers for imposed maximum values of the tensile and pressure forces which may be applied to them, are very close to the specified limit values.

In accordance with the process of the present invention an initial tube is defined by imposing a priori a set of values for the parameters, and, for the initial tube defined thereby, values are determined by the limit elongations and stresses. An effect on the limit elongations and stresses of slight deviations successively applied to each one of the parameters characterizing the initial tube are determined, in order to set up linear relationships globally relating the values of each of the limit elongations and stresses to the applied deviations. Inverse relationships expressing the effect of the variations of the values of the limit elongation and stresses on the values of the various parameters are determined, and step by step variations to be imposed upon the parameters defining the tube are selected in order to get as close as possible to values specified for the limit elongations and stresses of the desired tube.

The process can be applied to the optimizing of the features of cylindrical-symmetrical tubes fashioned of composite materials and consisting of a number of layers of defined thicknesses manufactured from at least two different composite materials, with each layer comprising several strips of helically wound fibers. The different layers are defined by at least two characteristic parameters such as, for example, thicknesses and angles between elongation directions of the fibers of the various strips and the axis of the tube, so that elongations of the layers under pressure and the temperature, the limit stress for a specified tensile stress undergone by the layers made of the same first composite material, and the limit stress for a specified maximum pressure undergone by the layers made of the same second composite material are very close to the specified limit values.

In accordance with the process of the present invention, an initial tube is defined by imposing a priori at least one common thickness value for the layers made of the same composite material and at least one common winding angle value for the fibers of the layers made of the same composite material. Values for an initial tube defined thereby, of the limit elongations and stresses are determined, and effects on the limit elongations and stresses of slight deviations successively applied to each one of the two angular values and of the two thickness characterizing the initial tube are determined, in order to establish a linear relationship globally relating to the variations of the values of each of the limit elongations and stresses to the applied deviations. Inverse relationships expressing the effect of the variations of the values of the elongations and stresses are the values of the different parameters are determined, and variations to be imposed upon the winding angles and the thickness defining the tubes to reduce the deviations between the limit elongations and stresses determined for the tube and the specified limit elongations and stresses in order to determine, as near as possible, the specified elongations and stresses are selected in a step by step process.

The process of the present invention may apply to the manufacturing of a tube comprising layers made of carbon fibers wound with a relatively large winding pitch and layers made of glass fibers wound up with a slighter winding pitch.

The process of the present invention may also apply, for example, to tubes in which the fibers of all the layers made from the same material show a substantially identical winding pitch.

The process of the present invention comprises, for example, determining the effect of the values of said limit elongations and stresses on the various parameters by calculating the inverse matrix of the matrix consisting of the linear relation coefficients relating the limit elongations and stresses to the applied deviations.

The optimized tube made of composite materials which is the object of the invention comprises a given number of layers of composite materials, with each layer including several strips of helically wound fibers, and with the different layers being defined by their thickness and the angles between the elongation directions of the fibers and the axis of the tube. The angles and the thicknesses, obtained by optimizing, are such that the elongation of the tube under the effect of the temperature and/or of the pressure, within a determined range of temperature and pressure variations, is substantially nil zero, and the limit stresses undergone by the different layers for imposed maximum values of the tensile and pressure forces which may be applied to them are substantially equal to specified limit values.

The tube can be made from at least two thicknesses and the angles are optimized so that the elongation of the tube under the effect of the pressure and/or the temperature, within a given range of temperature and pressure variation, is substantially zero, and the limit stress for a specified tensile stress undergone by the layers made of the same first composite material as well as the limit stress for a specified maximum pressure, undergone by the layers made of the same second composite material, are very close to the specified limit values.

According to the present invention the tube comprises layers consisting of carbon fibers wound with a relatively low winding angle with respect to the center axis of the tube, and layers consisting of glass fibers wound with a greater winding angle with respect to the axis center of the tube. The winding angle of the carbon fibers ranges, for example, from 10 to 25 degrees and that of the glass fibers ranges for example from 50 to 75 degrees.

The fibers of all the layers made from the same material can have a substantially identical pitch, but each layer can also have a variable winding pitch ranging around one average value.

According to a particular embodiment, the tube can be made from carbon and glass fibers whose moduli of elasticity in the direction of the fibers are respectively about 140 GPa and 56 GPa, with the degraded moduli of transverse elasticity and of shearing are about 1 GPa, and with the Poisson's factor being substantially 0.28, since these fibers can withstand respective limit stresses of about 1.2 GPa and 1.5 GPa and are wound up on a core the diameter of which is about 0.20 meter. With a tube so constructed for a limit tensile force of about 4,500 kN and a limit pressure of about 100 MPa with an elongation variation which is substantially zero for imposed ranges of the pressure and temperature variation, the comprises layers of carbon fibers of a thickness of about $5*10^{-3}$ meters wound following an angle of about 15 degrees, and layers of glass fibers of a thickness of about $10*10^{-3}$ meters wound following an angle of about 60 degrees.

According to a variant of the previous embodiment, the values of the winding angle of the fibers are average values, the winding angles of the different layers achieved with the same type of fiber ranging, from one layer to another, around the average values.

BRIEF DESCRIPTION OF THE DRAWING

Other features and advantages of the process according to the present invention will become more apparent from the following description with reference to the accompanying drawing wherein:

The Single FIGURE is a plied tube of composite materials on a cylindrical core constructed in accordance with the present invention.

DETAILED DESCRIPTION

The different steps of the process according to the present invention are as follows:

In a first step, a priori initial values are selected for the parameters to be optimized. The selected parameters may include, for example, an inner diameter D of the tube to be manufactured; an angle AC under which fibers of the first material are wound; an angle AV under which the fibers of the second material are wound; a thickness Ec of the layer of the first material; and/or a thickness Et of the layer of the second material.

In a second step, the objectives to be reached for the final tube are then decided; namely, a limit stress CLco which should not be exceeded in the second material; a corresponding limit stress CLvo in the first material for a specified pressure; a maximum allowable elongation dLpo under the effect of the pressure, with the maximum allowable elongation dLpo being, for example, zero; and/or a maximum allowable elongation dLto under the effect of the temperature, with the maximum allowable elongation dLto being, for example, zero.

In a third step, the initial tube, defined a priori, the effective values of the limit stresses CLc and CLv in the first and second materials for the specified tensile strength and pressure, as well as the elongations dLp and dLt of the tube under the effect of the specified pressure and temperature, can be determined.

These limit stresses and elongations are determined by applying Hooke's and Kirchhoff's laws.

In step four a first parameter among those selected for characterizing the initial tube, for example, the angle Ac of the fibers of the first material is then slightly changed. Let $\Delta Ac$ be the value of the deviation. The influence of the applied deviation on the effects is then determined, that is to say the limit stresses CLc,CLv and the elongations dLp and dLt obtained for the tube a priori. Variations $\Delta CLc$, $\Delta CLv$, $\Delta dLp$ and $\Delta dLt$ are, for example, determined for these four stresses and elongations. These results allow a determination of the relative variations $\Delta CLc/\Delta Ac$, $\Delta CLv/\Delta Ac$, $\Delta dLp/\Delta Ac$ and $\Delta dLt/\Delta Ac$.

In order to simplify the notations, an (effect, parameter) "I" hereafter will refer to the relationship between the variation of an effect concomitant to the variation of a parameter. Thus, in the example, described above the relationship $\Delta CLc/\Delta Ac$, $\Delta CLv/\Delta Ac$, $\Delta dLp/\Delta Ac$ and $\Delta dLt/\Delta Ac$ will be be referred to as: I(CLc,Ac), I(CLv,Ac), I(dLp,Ac) and I(dLt,Ac).

A second parameter of the tube defined a priori is then slightly varied in the same way. A deviation $\Delta Av$ is for example, applied to the angle Av and under which the fibers of the second material are wound the deviations $\Delta CLc$, $\Delta CLv$, $\Delta dLp$ and $\Delta dLt$ on the stresses and elongations are determined in order to form the ratios I(CLc,Av), I(CLv,Av), I(dLp,Av) and I(dLt,Av).

For a deviation $\Delta Ec$ applied to the thickness Ec of the layer of the first material, the same process is repeated in order to obtain the ratios I(CLc,Ec), I(CLv,Ec), I(dLp,Ec) and I(dLt,Ec). A deviation $\Delta Et$ applied to the thickness Et of the layer of the second material will lead, through the same process, to the forming of the following ratios I(CLc,Et), I(CLv,Et), I(dLp,Et) and I(dLt,Et).

In a fifth step, it is then possible to establish the global effect on each characteristic stress and elongation of slight variations simultaneously applied to the four parameters in the form of linear combinations of the parameters, with the proportional coefficients being the values of the incidents obtained above. The relationships between the global variations VG(CLc), VG(CLv), VG(dLp) and VG(dLt) of the stresses and elongations under the effect of the parameter variations can be expressed by the following relationships:

$VG(CLc) = I(CLc,Ac) * \Delta Ac + I(CLc,Av) * \Delta Av + I(CLc,Ec) *$ $\Delta Ec + I(CLc,Ev) * \Delta Et,$ $VG(CLv) = I(CLv,Ac) * \Delta Ac + I(CLv,Av) * \Delta Av + I(CLv,Ec) *$ $\Delta Ec + I(CLv,Ev) * \Delta Et,$ $VG(dLp) = I(dLp,Ac) * \Delta Ac + I(dLp,Av) * \Delta Av + I(dLp,Ec) *$ $\Delta Ec + I(dLp,Ev) * \Delta Et,$ $VG(dLt) = I(dLt,Ac) * \Delta Ac + I(dLt,Av) * \Delta Av + I(dLt,Ec) *$ $\Delta Ec + I(dLt,Ev) * \Delta Et.$ All of the above relationships can be expressed more conveniently in the following matrix M:

$$\begin{pmatrix} VG(CLc) \\ VG(CLv) \\ VG(dLp) \\ VG(dLt) \end{pmatrix} =$$

-continued $$\begin{pmatrix} I(CLc,Ac) & I(CLc,Av) & I(CLc,Ec) & I(CLc,Et) \\ I(CLv,Ac) & I(CLv,Av) & I(CLv,Ec) & I(CLv,Et) \\ I(dLp,Ac) & I(dLp,Av) & I(dLp,Ec) & I(dLp,Et) \\ I(dLt,Ac) & I(dLt,Av) & I(dLt,Ec) & I(dLt,Et) \end{pmatrix} * \begin{pmatrix} Ac \\ Av \\ Ec \\ Ev \end{pmatrix}$$

The matrix M above relates the global variations of the stresses and elongations undergone by the tube to the deviations imposed on the parameters.

In a sixth step, the relationships which relate the deviations imposed on the parameters to the global variations of the stresses and elongations are then reciprocally determined. It is thereby possible to know with precision the incidence which the variations imposed on the parameters can have on the performances of the tube. The operation can be conveniently carried out by means of a computer programmed to invert the matrix M and the result is:

$$\begin{pmatrix} Ac \\ Av \\ Ec \\ Ev \end{pmatrix} = M^{-1} * \begin{pmatrix} VG(CLc) \\ VG(CLv) \\ VG(dLp) \\ VG(dLt) \end{pmatrix}$$

where $M^{-1}$ is the inverse of matrix M.

The initial tube has been defined a priori and the performances concerning the resistance towards the stresses and elongations CLc, CLv, dLp and dLt which have been previously established do generally not correspond to the fixed objectives which are CLco, CLvo, dLpo, dLto.

In step seven, if the differences between the performances of the tube defined a priori and the objectives are not considerable, the values of these differences are assigned to the global variations VG(CLc), VG(CLv), VG(dLp), VG (dLt). The coefficients of the inverse matrix being known, the deviations $\Delta Ac$, $\Delta Av$, $\Delta Ec$, $\Delta Ev$ to be respectively applied to the four parameters in order to make up these differences are then determined. The values of the winding angles of the fibers in the various strips and the thickness of the different layers allowing to precisely reach the fixed objectives are thus obtained.

In step eight, if the differences are considerable, better results are obtained by carrying out successive stages. Determined values less than the differences to be made up are assigned to the global variations VG(CLc), VG (CLv), VG(dLp) and VG(dLt). This allows a determination of the corresponding variations of the four parameters. The modified tube characterized by the new values of the parameters is then used as the new reference tube.

Step three is repeated once more in order to determine the new limit stresses and elongations CLc, CLv, dLp and dLt of the new reference tube, then steps four to six and eight are repeated in order to obtain new relations relating the parameters to the newly obtained global variations.

New cycles are carried out until the final deviations to be made up between the objectives and the obtained global variations are low enough. A last cycle ended with step seven allows a reaching of the precise values of the parameters of the optimized tube.

In the example that is given hereafter to clearly show the preciseness which can be reached in determining the features of a tube made of composite materials, the case is considered where the tube comprises a pair of superposed layers respectively achieved by winding glass fibers and carbon fibers on a cylindrically symmetrical tubular core with an imposed diameter of, for example 0.2308 m, with the fiber layers being incorporated in a binder made of resin.

Measurements are possible to determine the characteristic features of the carbon layers hand and of the glass layers.

| FEATURE | CARBON | GLASS |
|---|---|---|
| Modulus of elasticity: | | |
| . in the direction of the fibers | 140 000 MPa | 56 000 MPa |
| . in a transverse direction (degraded) | 1 000 MPa | |
| Shear modulus (degraded) | 1 000 MPa | 1 000 MPa |
| Poisson's ratio | 0.28 | 0.28 |
| Limit stress in the direction of the fibers | 1 200 MPa | 1 500 MPa |
| Thermal expansion: | | |
| . in the direction of the fibers | 0 | $4 \times 10^{-6}/°C$ |
| . in a transverse direction | $40 \times 10^{-6}/°C$ | $35 \times 10^{-6}/°C$ |

The objective to reach is defined by the following features of the limit stresses and elongations:

the limit stress CLco in the carbon layer for a 4.500 kN tensile stress is set at 1.200 MPa;

the limit stress CLco in the glass layer for a 105 MPa pressure is set at 1.500 MPa;

the elongations dLpo and dLto of the tube under the effect of the temperature and the pressure are set to be substantially zero.

The implementing of the process of the present invention, from an initial tube with non optimized features, leads to the following values for the winding angles and the thicknesses of the layers:

| | Angle | Thickness |
|---|---|---|
| Carbon | 15.84° | 0.0052 m |
| Glass | 59.33° | 0.0103 m |

By way of checking, the limit stresses and elongations undergone by a tube made of the superposition on a core of a layer of glass fibers and another layer of carbon fibers are determined with the angle values and the thicknesses above. The results obtained were as follows:

limit stress CLco for a 4.500 kN tensile stress: 1.198 MPa;
limit stress CLvo for a 105 MPa pressure: 1.499 MPa
maximum elongation dLto: $-0.0014 * 10^{-6}/°C$; and
maximum elongation dLpo: $0.014 * 10^{-6}/MPa$.

It can be seen thereby that the process according to the invention leads to results which are practically identical to the specified elongations and stresses.

The process has been described considering the case of a cylindrical-symmetrical tube consisting of the superposition of at least two layers made from fibers of two different materials, with, for example, the layers made from one material having substantially the same winding angle and the same thickness. Under these conditions, the number of parameters to be determined amounts to four. But it would remain within the scope of the invention to apply the process to tubes the shape and the composition of which require the determining of a greater number of parameters in order to meet other particular conditions. If, for example, it possible to achieve a multilayered tube from two different sorts of fibers, with each layer comprising several pairs of fiber strips where the winding angle of the fibers of the same substance ranges from one strip to another and from one layer to another around an average value. For an average angle value set, for example, at 60°, the winding angles will, for example be in a range of between 55° and 65°. Whatever the number of significant parameters the process as described above may be carried out in the same way as previously by investigating the coefficients of the linear relationships which relate to deviations successively applied to all the parameters to their effects on the stresses and elongations.

We claim:

1. A process for manufacturing a multilayered tube fashioned of composite materials, the multilayered tube including a plurality of layers of composite materials with each layer comprising several strips of helically wound fibers, each of said layers being defined by at least two parameters so that an elongation due to temperature, pressure and stress to which the different layers are subjected correspond to predefined maximum values of tensile and pressure forces that are to be applied to the respective layers, the process comprising the steps of:

defining a set of values for said parameters of an initial tube;

determining limit values of said elongation and stress for the initial tube;

determining an incidence on said limit values of said elongation and stress of slight deviation successively applied to each one of said parameters to establish linear relationships relating to the values of each of said limit values of elongation and stress to the deviations;

determining inverse relationships expressing an incidence of variations of said limit values of elongation and stress on the values of the different parameters;

selecting step by step variations imposed on the parameters to define the multilayered tube in order to obtain limit values of each elongation and stress substantially corresponding to said set of values for the initial tube; and winding said layers having said limit values of elongation and stress defined in the selecting step to form the multilayered tube.

2. A process for manufacturing a multilayered cylindrical-symmetrical tube fashioned of composite materials and including a plurality of layers fashioned of at least two different composite materials, each layer comprising several strips of helically wound fibers, the respective layers being defined by at least two parameters including a thickness of the respective layers and winding angles of the fibers of the respective strips with respect to a center axis of the tube so that elongation of the respective layers due to pressure and temperature, a limit stress for a specified tensile strength undergone by the layers of the same first composite material and the limit stress for a specified maximum pressure undergone by the layers of the same second composite material substantially correspond to specified limit values, the process comprising the steps of:

defining an initial tube by setting a common thickness value on layers fashioned of the same composite material and at least one common winding angle value for fibers of the layers made of the same composite material;

determining limit values for elongation and stress for the initial tube;

determining incidences of said elongation and stress of slight deviations successively applied to each of the two values of the winding angle and the two thicknesses to establish linear relationships relating to variations of values of each elongation and stress to all of the applied deviations;

determining inverse relationships expressing an incidence of variations of said elongation and stress on values of the respective parameters;

selecting step by step variations to be imposed on said winding angles and said thicknesses defining said tube to reduce deviations between limit values of elongation and stress determined for the tube and predefined limit values for elongation and stress to obtain values for the tube substantially corresponding to said predefined limit values for elongation and stress; and winding said strips fashioned of a material having said limit values of elongation and stress determined in the selecting step to form the multilayered tube.

3. A process as claimed in claim 2, wherein at least one of the layers is fashioned of carbon fibers wound at a relatively large winding angle, and wherein at least one other layer is fashioned of glass fibers wound at a smaller winding angle.

4. A process as claimed in claim 3, wherein fibers of all layers fashioned of the same material have a substantially identical winding angle.

5. A process as claimed in claim 1, wherein the incidence of the limit values of said elongation and stress on the at least two parameters is determined by determining a matrix inverse to a matrix including coefficience of the linear relationships relating to said values of elongation and stress to said deviations.

6. A process according to claim 3, wherein the carbon fibers are wound at a winding angle in a range of between 10° and 25°, and wherein the winding angle of the glass fibers is in a range between 50° and 75°.

7. A process according to claim 3, wherein the carbon fibers and the glass fibers have a modulus of elasticity in the direction of fibers of 140 GPa and 56 GPa, respectively, a degraded transverse elasticity modulus and shear modulus of about 1 GPa, a Poisson's factor substantially equal to 0.28, said carbon and glass fibers being adapted to withstand the respective limit stresses of 1.2 GPa and 1.5 GPa and being wound on a core having a diameter of about 0.20 meters, wherein the tube has a limit tensile force of about 4,500 kN and a limit pressure of about 100 MPa with an elongation variation substantially equal to zero for imposed ranges of a temperature and pressure variation, and wherein said tube is made of layers of carbon fibers with a thickness range of $5 \cdot 10^{-3}$ meters wound at an angle of about 15° and layers of glass fibers with a thickness in a range of about $10 \cdot 10^{-3}$ meters wound at an angle of about 60°.

* * * * *